United States Patent [19]
Makita et al.

[11] Patent Number: 5,340,215
[45] Date of Patent: Aug. 23, 1994

[54] RADIANT-ENERGY CLINICAL THERMOMETER

[75] Inventors: Shigeru Makita; Yoshihiko Sano; Hiroyuki Ota, all of Kyoto, Japan; Yasushi Nakamura, Irvine, Calif.

[73] Assignee: OMRON Corporation, Kyoto, Japan

[21] Appl. No.: 78,320

[22] PCT Filed: Dec. 26, 1991

[86] PCT No.: PCT/JP91/01775
§ 371 Date: Jun. 28, 1993
§ 102(e) Date: Jun. 28, 1993

[87] PCT Pub. No.: WO92/11800
PCT Pub. Date: Jul. 23, 1992

[30] Foreign Application Priority Data
Dec. 29, 1990 [JP] Japan .................. 2-416036

[51] Int. Cl.$^5$ .......... G01K 1/08; G01K 1/14; A61B 5/00; G01J 5/02
[52] U.S. Cl. .................. 374/121; 374/158; 374/208; 374/209; 128/736; 128/664
[58] Field of Search .......... 374/121, 158, 208, 209; 128/664, 736; 206/306

[56] References Cited
U.S. PATENT DOCUMENTS

| | | | |
|---|---|---|---|
| 4,743,122 | 5/1988 | Yamano et al. | 374/208 |
| 4,784,149 | 11/1988 | Berman et al. | 374/129 |
| 4,790,324 | 12/1988 | O'Hara et al. | 374/158 |
| 4,863,281 | 9/1989 | Suszynski | 374/209 |
| 4,993,424 | 2/1991 | Suszynski et al. | 374/158 |
| 5,018,872 | 5/1991 | Suszynski et al. | 374/209 |
| 5,088,834 | 2/1992 | Howe et al. | 374/209 |
| 5,159,936 | 11/1992 | Yelderman et al. | 374/158 |
| 5,163,418 | 11/1992 | Fraden et al. | 374/158 |
| 5,188,459 | 2/1993 | Mino et al. | 374/209 |

FOREIGN PATENT DOCUMENTS 62-50147 10/1987 Japan .
63-157628 10/1988 Japan .
8906348 7/1989 World Int. Prop. O. .......... 374/121

*Primary Examiner*—Diego F. F. Gutierrez
*Attorney, Agent, or Firm*—Foley & Lardner

[57] ABSTRACT

An upper portion of a case body (1) of a radiant-temperature clinical thermometer is integrally formed to include a supporting frame (11) to which a supporting cylinder (2) is secured horizontally. The tip of the supporting cylinder (2) projects outwardly and a radiant-temperature sensor (3) for sensing heat rays from the external ear is secured to the end face of the tip. A cylindrical probe (4) is supported on the supporting cylinder (2) so as to be free to slide, and the cylindrical probe (4) is biased by a coil spring (42) in a direction that thrusts the probe outwardly. A flange (41) on the base end of the cylindrical probe (4) abuts against a stopper (12) of the supporting frame (11), whereby the extended position of the cylindrical probe (4) is determined. A cover (9) is attached to the tip portion of the cylindrical probe (4). When the tip portion of the cylindrical probe (4) is inserted slightly into the orifice of the ear and pressed, the cylindrical probe (4) retracts and a lever (51) of a microswitch (5), which is attached to the supporting frame (11), is pressed by the flange (41) of the cylindrical probe (4). The switch (5) produces an ON signal as a result. The ON signal is applied as a measurement-start trigger signal to a temperature measuring circuit provided within the case body (1). Thus, the timing at which temperature measurement starts is always fixed so as to reduce a variance in measured temperature.

12 Claims, 6 Drawing Sheets

RADIANT-ENERGY CLINICAL THERMOMETER

DESCRIPTION

1. Technical Field

This invention relates to a radiant-energy clinical thermometer for measuring body temperature by measuring the amount of energy radiated from the human body, especially radiant energy (heat rays) in the infrared region. More particularly, the invention relates to a radiant-energy clinical thermometer suitable for sensing heat rays from the external ear of the human body.

2. Background Art

A radiant-energy clinical thermometer is equipped with a probe projecting outwardly from a portion of a case body. The tip of the probe is open and a radiant-temperature sensor (a thermopile, for example) is provided within the opened tip. When the tip of the probe is inserted slightly into the orifice of the ear, heat rays emitted from the external ear impinge upon the radiant-temperature sensor. The temperature sensor is connected to a temperature measuring circuit provided within the case body. The measuring circuit determines the body temperature based upon the output of the temperature sensor. The radiant-energy clinical thermometer is capable of measuring body temperature in a short period of time in a basically contactless manner (the temperature sensor at least does not contact the human body).

The radiant-energy clinical thermometer has a measurement starting switch, which is provided on the case body. The switch is operated manually. Closing the measurement starting switch starts the operation of the temperature measuring circuit.

The timing at which the measurement starting switch is closed differs from one operation to the next depending upon the operator. There are individuals who close the switch immediately upon inserting the tip of the probe into the ear orifice, and there are individuals who operate the switch upon passage of a short period of time following insertion of the probe.

The radiant-temperature sensor is readily influenced by a slight change in the state of the external ear, and the measured temperature fluctuates with the passage of time upon insertion of the probe into the ear orifice. Accordingly, measuring body temperature under identical conditions at all times is desirable.

When the timing at which the measurement starting switch is operated differs depending upon the individual and depending upon time as mentioned above, a variance appears in the value of measured body temperature. Measures for making the measurement starting time the same on all occasions are desired.

An object of the present invention is to provide a radiant-energy clinical thermometer in which the timing for starting measurement of body temperature is capable of being fixed at all times.

DISCLOSURE OF THE INVENTION

A radiant-energy clinical thermometer according to the present invention comprises a support member having a portion projecting outwardly from a case body, a radiant-temperature sensor attached to a tip of the outwardly projecting portion of the support member, a cylindrical probe held by the support member in a freely extendible and retractable manner and having an open tip, a biasing mechanism for biasing the cylindrical probe outwardly and holding the tip of the cylindrical probe at a position at which it covers the periphery of the temperature sensor, and switch means for sensing that the cylindrical probe has been retracted against a biasing force of the biasing mechanism and generating a trigger signal that starts measurement of body temperature.

When the radiant-energy clinical thermometer is not used, the cylindrical probe is in the outwardly extended state so that the periphery of the radiant-temperature sensor attached to the tip of the support member is covered by the cylindrical probe. As a result, the temperature sensor is protected.

When the cylindrical probe is inserted into the orifice of the ear in order to measure body temperature, the cylindrical probe is retracted against the biasing force of the biasing mechanism. The radiant-temperature sensor is situated near the opening in the tip of the retracted cylindrical probe. The fact that the cylindrical probe has been retracted is sensed by the switch means, which proceeds to generate the trigger signal for starting the measurement of body temperature. As a result, a body-temperature measuring circuit provided within the case body starts operating and determines the body temperature based upon the output of the temperature sensor. The body temperature determined is displayed on a display device provided on the case body.

Thus, when the cylindrical probe is inserted into or contacted with the part of the body measured, such as the orifice of the ear, the switch means automatically generates the trigger signal at this time to start the measurement of body temperature. Accordingly, the conditions of body-temperature measurement are regularized at all times irrespective of the individual and irrespective of time. As a consequence, the occurrence of a variance in measured values and the occurrence of errors may be prevented in advance.

When the cylindrical probe is separated from the part being measured, it is extended outwardly by the biasing force of the biasing mechanism so as to return to the state in which the temperature sensor is protected. The switch means opens to conclude measurement.

Preferably, a cover conforming to the human ear is attached to the tip portion of the cylindrical probe in a detachable manner.

By attaching the cover to the tip portion of the cylindrical probe, it is possible to prevent external wounds that are easily produced when the tip of the cylindrical probe is inserted into the ear orifice. By changing the cover for each individual measured, the transmission of disease can be prevented even when the radiant-energy clinical thermometer is shared.

Covers having a variety of sizes and shapes are prepared in advance in conformity with sizes and shapes of ear orifices.

In an embodiment of the present invention, a locking mechanism is further provided for preventing the cylindrical probe from retracting from the position at which it covers the periphery of the temperature sensor. Preferably, the locking mechanism includes a locking lever operated from outside the case body.

When the radiant-energy clinical thermometer is not used, the cylindrical probe is retained in the projected state by the locking mechanism, thereby protecting the temperature sensor at all times and making it possible to prevent a situation in which measured in started by inadvertent closure of the switch means. This is very useful when the radiant-energy clinical thermometer is transported or handled in a disorderly manner.

When the cover is removably attached to the cylindrical probe, and particularly when it is fitted on the probe, movement of the cylindrical probe is inhibited. As a result, it is easy to attach and detach the cover and prevent the switch from being closed.

In another embodiment of the present invention, a mechanism is further provided for pushing out the cover along the cylindrical probe in order to detach the cover attached to the tip of the cylindrical probe in a freely detachable manner. Preferably, the pushing mechanism includes a slider operated from outside the case body.

It is so arranged that the cover attached to the tip of the cylindrical probe is capable of being easily detached by the pushing mechanism.

BRIEF DESCRIPTION OF THE DRAWINGS

The drawings illustrate an embodiment of the present invention, in which.

BEST MODE FOR CARRYING OUT THE INVENTION

Figure 1:
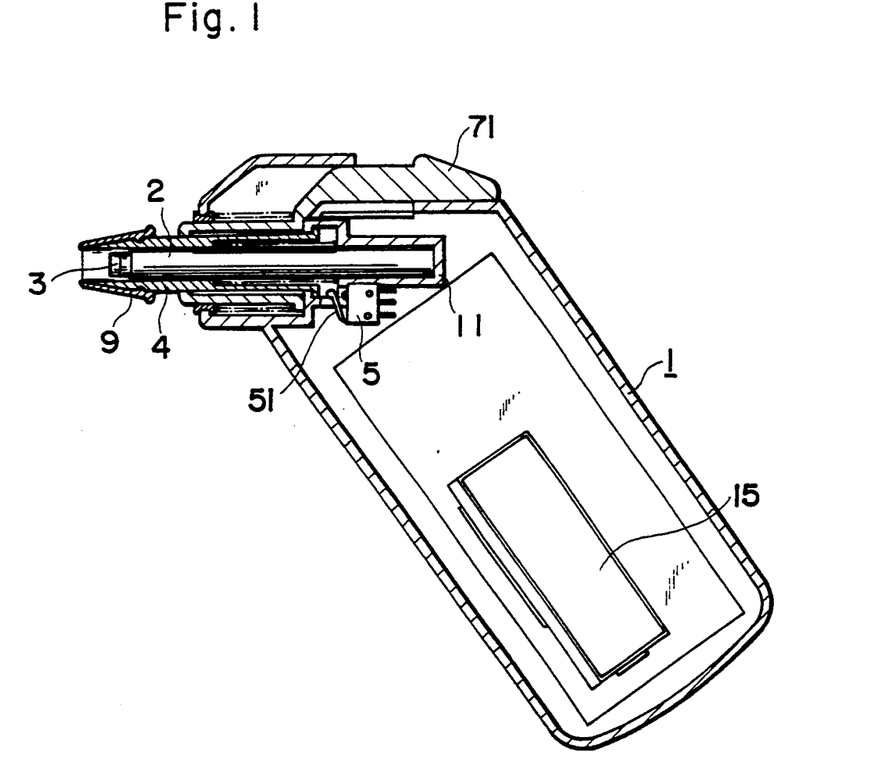
FIG. 1 is a longitudinal sectional view illustrating the entirety of a radiant-energy clinical thermometer.

FIG. 1 illustrates the overall configuration of a radiant-energy clinical thermometer.

A case body 1 extends downwardly at an incline so as to be easily grasped by the hand. A body-temperature measuring circuit (not shown) is incorporated within the case body 1. A display unit, such as a liquid-crystal display unit 15, for displaying a measured temperature is attached to one side of the case body 1 so that the temperature displayed on the display unit 15 can be observed from the outside.

The upper portion of the case body 1 is integrally formed to include a supporting frame 11 to which a supporting cylinder 2 is secured horizontally. A portion of the supporting cylinder 2 projects outwardly from the supporting frame 11.

A radiant-temperature sensor 3 is secured to the distal end face of the supporting cylinder 2. The radiant-temperature sensor 3 is constituted by a thermopile, for example, and is connected to the body-temperature measuring circuit through lead wires disposed within the supporting cylinder 2.

A cylindrical probe 4 is fitted over the supporting cylinder 2 and is free to slide in the longitudinal direction thereof. A switch, such as a microswitch 5, is secured to the supporting frame 11.

The foregoing will be described in greater detail with reference to FIGS. 2 and 3.

The base portion of the cylindrical probe 4 is formed to have a comparatively large inner diameter, and a gap is provided between inner peripheral surface of the cylindrical probe 4 and the outer peripheral surface of the supporting cylinder 2. A coil spring 42 is disposed within the gap. One end of the coil spring 42 abuts against the supporting frame 11, and the other end of the spring abuts against the inner wall surface of the cylindrical probe 4. The cylindrical probe 4 is biased by the coil spring 42 in a direction that thrusts the distal end of the probe outwardly.

The base end of the cylindrical probe 4 is formed to have a flange 41. The supporting frame 11 is formed to have a stopper 12 that engages with the flange 41. The extended position of the cylindrical probe 4 biased outwardly by the coil spring 42 is decided by the flange 41 coming into contact with the stopper 12. When the cylindrical probe 4 is in the extended position, as shown in FIG. 2, its tip projects outwardly from the supporting cylinder 2 and the temperature sensor 3 secured to the tip of the supporting cylinder 2 assumes a state in which the periphery thereof is completely covered by the cylindrical probe 4. The tip of the cylindrical probe 4 is open.

Part of the supporting frame 11 is cut away and a lever 51 of the microswitch 5 secured to the supporting frame 11 penetrates into the interior of the supporting frame 11 from the portion that has been cut away. When the cylindrical probe 4 is in the extended position, the base end of the cylindrical probe 4 is not in contact with the lever 51. The switch 5 is held in the off state at this time.

Figure 3:
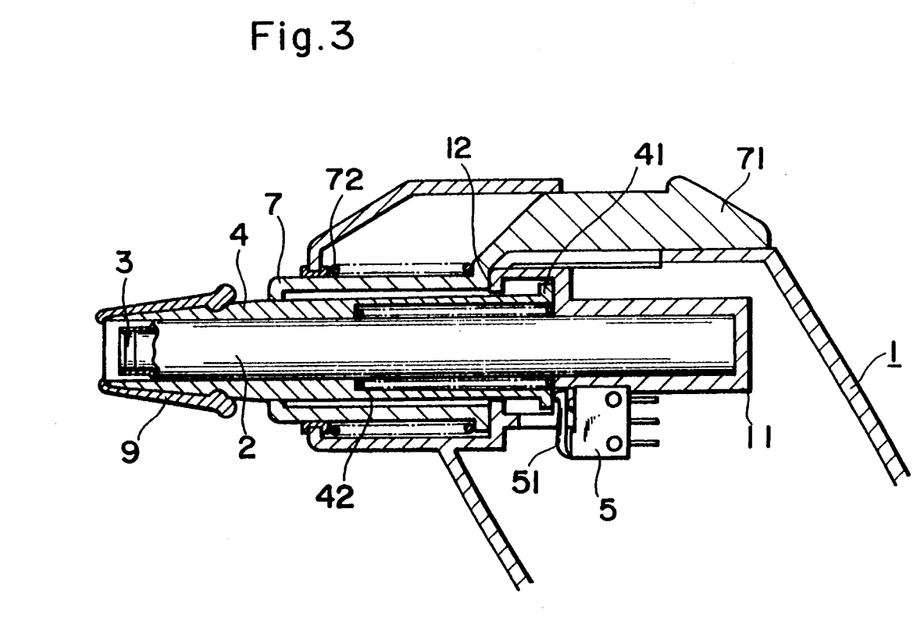
FIG. 3 is an enlarged longitudinal sectional view of a portion of the radiant-energy clinical thermometer and illustrates the thermometer when in use.

When the cylindrical probe 4 is caused to retract against the biasing force of the spring 42 by an externally applied force, as shown in FIG. 3, the lever 51 of the switch 5 is pushed by the flange 41 so that the switch 5 is closed. An ON signal from the switch 5 is applied to the temperature measuring circuit as the trigger signal for starting measurement. The retracted position of the cylindrical probe 4 is decided by the flange 41 coming into contact with a portion of the supporting frame 11. In this embodiment, the periphery of the temperature sensor 3 is substantially protected by the tip portion of the cylindrical probe 4 even when the cylindrical probe 4 is in the retracted position.

The outer peripheral surface of the tip of cylindrical probe 4 is formed so that the probe becomes incrementally more slender toward the tip. An annular groove is formed in the outer peripheral surface of the tip portion.

A cover 9 is attached to the tip of the cylindrical probe 4 in a freely detachable manner. The cover 9 is formed from a material that is as flexible as possible, and so as to free of corners, so that the orifice of an ear will not be hurt when the tip of the cylindrical probe 4 is inserted slightly into the ear orifice in order to measure body temperature. An annular projection formed on the inner peripheral surface of the cover 9 fits into the annular groove formed in the tip of the cylindrical probe 4.

The cover 9 is prepared beforehand in a number of types having different sizes and shapes in conformity with sizes and shapes of ear orifices. Preferably, the cover 9 is changed for each individual whose body temperature is to be measured, and a cover suited to the individual is used. This is useful also in preventing the transmission of disease.

Figure 6:
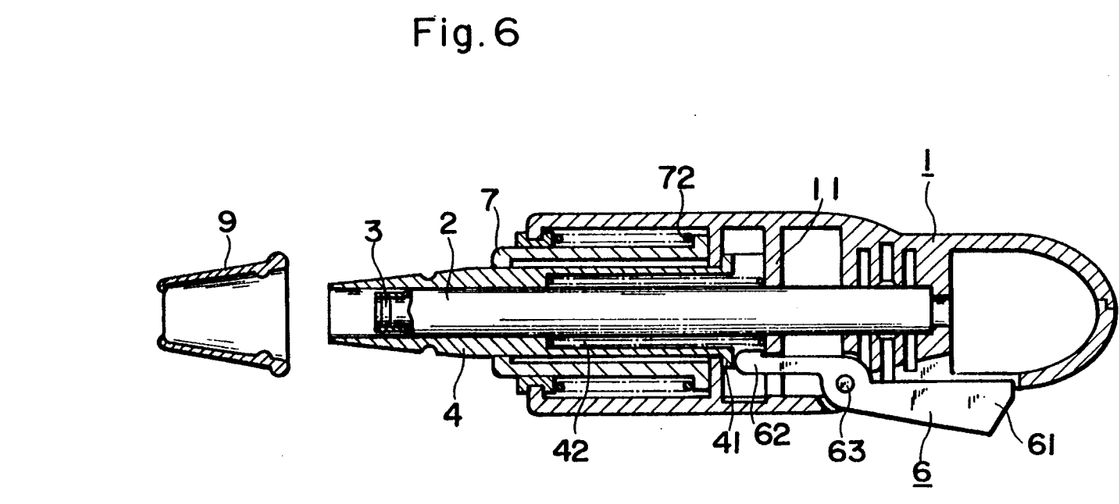
FIG. 6 is an enlarged transverse sectional view of a portion of the radiant-energy clinical thermometer and illustrates a cover of the thermometer in the detached state.

A cover pushing member 7 is fitted onto the periphery of the cylindrical probe 4 so as to be free to move in the longitudinal direction thereof. A slider 71 for being pushed by a finger is integrally formed on the pushing member 7. A coil spring 72 is provided between a portion of the case body 1 and a portion of the pushing member 7 to bias the pushing member 7 at its retracted position. The retracted position of the pushing member 7 is decided by a portion of the pushing member 7 coming into contact with a portion of the case body 1. By pushing the slider 71 against the biasing force of the spring 72, the pushing member 7 is moved along the outer periphery of the cylindrical probe 4 to remove the cover 9 that has been attached to tip of the cylindrical probe 4.

Figure 4:
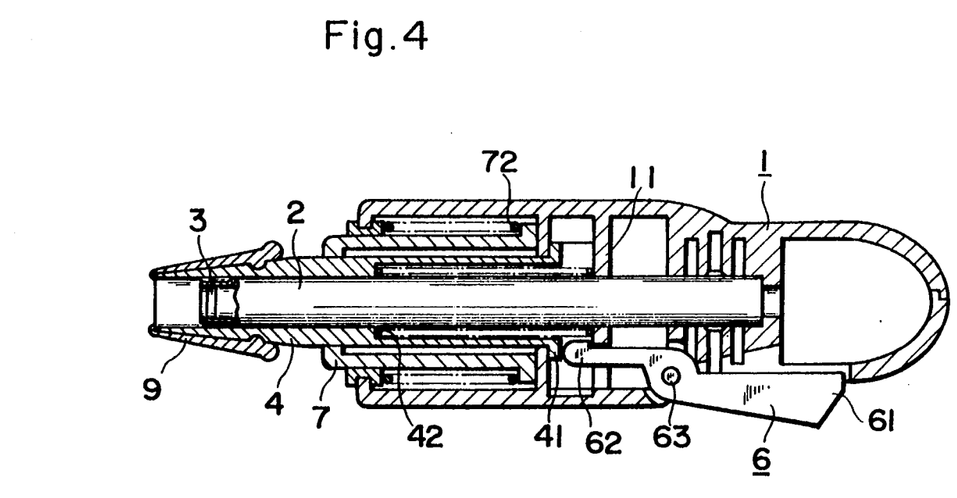
FIG. 4 is an enlarged transverse sectional view of a portion of the radiant-energy clinical thermometer and illustrates the thermometer when not in use.
Figure 5:
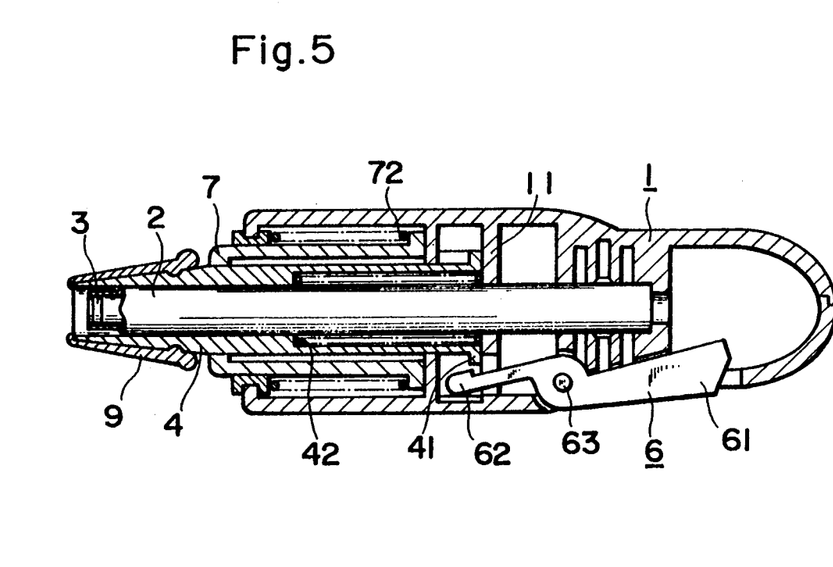
FIG. 5 is an enlarged transverse sectional view of a portion of the radiant-energy clinical thermometer and illustrates the thermometer when in use.

AS shown in FIGS. 4 through 6, a locking lever 6 is mounted at its midpoint to the case body 1 by means of a shaft 63 so as to be free to rock back and forth.

As illustrated in FIG. 4, the locking lever 6 is biased by a spring (not shown) in such a manner that an operating portion 61 thereof projects slightly from the case body 1 while an acting portion 62 of the lever penetrates into the interior of the supporting case 11. In this state the tip of the acting portion 62 of locking lever 6 is in abutting contact with the flange 41 of the cylindrical probe 4 so that the cylindrical probe 4 is locked in the extended position. In other words, even if the tip of the cylindrical probe 4 is pressed in an effort to cause its retraction, the flange 41 abuts against the acting portion 62 so that the cylindrical probe 4 will not move.

When the operating portion 61 of the locking lever 6 is pressed into the case body 1 by a finger or the like, as shown in FIG. 5, the acting portion 62 is moved outward so that it is disengaged from the flange 41 of the cylindrical probe 4. In this state, the cylindrical probe 4 is capable of being retracted by an external force against the biasing force of the spring 42.

Figure 2:
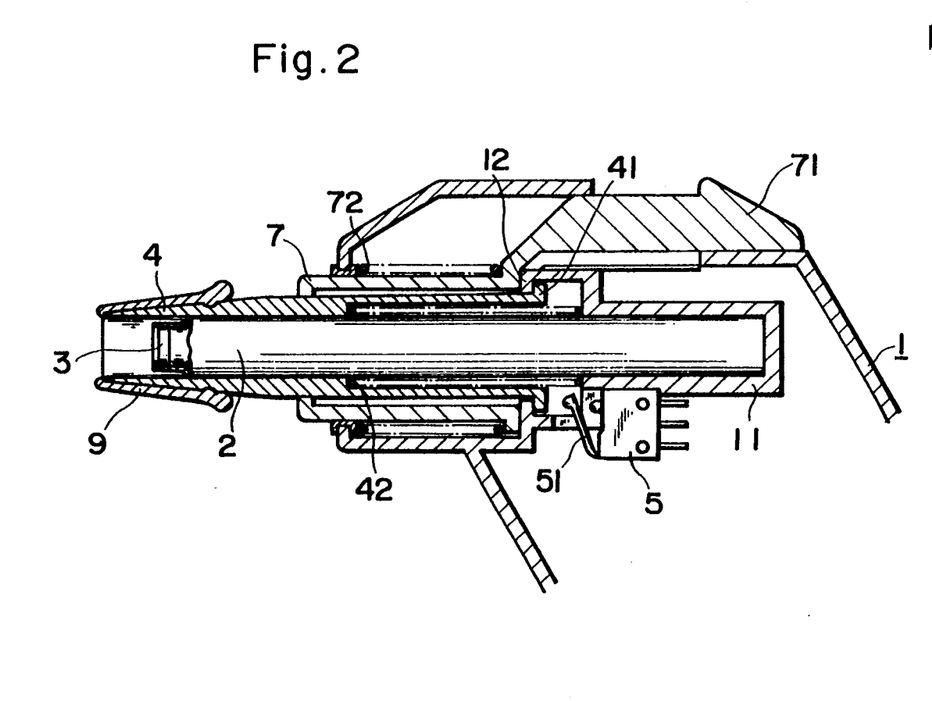
FIG. 2 is an enlarged longitudinal sectional view of a portion of the radiant-energy clinical thermometer and illustrates the thermometer when not in use.

When the radiant-energy clinical thermometer having this construction is not being used, the cylindrical probe 4 is outwardly extended by the biasing force of the spring 42, as illustrated in FIGS. 2 and 4. The acting portion 62 of the locking lever 6 engages the flange 41 so that the cylindrical probe 4 is held in the extended position. As a result, the cylindrical probe 4 will not retract, and the switch 5 will not close, when the thermometer is carried about or even if the thermometer is handled carelessly. Since the cylindrical probe 4 is in the extended position, the temperature sensor 3 attached to the distal end face of the supporting cylinder 2 is protected by the cylindrical probe 4 so that there is almost no danger of contamination or of adverse thermal effects. Since the flange 41 of the cylindrical probe 4 is spaced away from the lever 51 of the switch 5, the switch 5 is held in the off state.

In order to measure body temperature, the operating portion 61 of the locking lever 6 is pressed. Since the acting portion 62 moves in the outward direction, its locking action is eliminated so that the cylindrical probe 4 attains a state in which it is capable of being extended or retracted. With the operating portion 61 of the locking lever 6 being held in the pressed state, the tip of the cylindrical probe 4 to which the cover 9 has been attached is inserted slightly into the orifice of an ear and is pressed gently toward the orifice, whereupon the cylindrical probe 4 is retracted against the biasing force of the spring 42, as illustrated in FIG. 3. As a result, the temperature sensor 3 is situated in the proximity of the opening in the tip of the cylindrical probe 4, and a state is attained in which thermal radiation from the external ear is capable of being sensed. Further, since the flange 41 of the retracted cylindrical probe 4 presses the lever 51 of the switch 5, the switch 5 is closed. The trigger signal generated by the switch 5 is applied to the body-temperature measuring circuit to start the operation for measuring body temperature. The temperature sensor 3 accurately senses the heat rays emitted from within the orifice of the ear, and the body temperature is decided by the body-temperature measuring circuit based upon the output of the temperature sensor 3. The body temperature determined is displayed on the display unit 15.

Thus, by causing the cylindrical probe to retract by pressing it against the body part whose body temperature is to be measured, the switch 5 is closed to automatically start the measurement of body temperature. As a result, a situation in which the timing at which body temperature is measured differs from person to person and from one time to another is avoided, thus making it possible to measure body temperature under identical conditions at all times.

When measurement of body temperature is concluded, the cylindrical probe 4 need only be separated from the orifice of the ear. The cylindrical probe 4 is extended and returns to its original position owing to the force of the spring 42. When the operating portion 61 of the lever 6 is released, the lever 6 also returns to its original position so that the cylindrical probe 4 is locked.

The cover 9 attached to the tip of the cylindrical probe 4 is capable of being freely attached and detached. Accordingly, the cover best suited to the person undergoing temperature measurement may be selected and attached to the cylindrical probe 4. In order to remove the cover 9 from the cylindrical probe 4, the slider 71 need only be pressed to push off the cover 9 by the pushing member 7. When the optimum cover 9 is attached to the cylindrical probe 4, the cylindrical probe 4 will not move, even if it is pushed, since the acting portion 62 of the locking lever 6 is in abutting contact with the flange 41, as mentioned above. Thus the cover 9 may be attached in a reliable manner and the switch 5 will not be closed inadvertently at this time.

Though the microswitch 5 is illustrated in the foregoing embodiment, it goes without saying that a switch such as a proximity switch or photoelectric switch can also be used.

INDUSTRIAL APPLICABILITY

The present invention relates to improvements in a radiant-energy clinical thermometer, which is a clinical thermometer of a new type. Clinical thermometers fall within the purview of the medical-instruments industry and are utilized in this field.

What is claimed is:

1. A radiant-energy clinical thermometer for measuring body temperature comprising:
    a support member having a portion projecting outwardly from a case body;
    a radiant-temperature sensor attached to a tip of the outwardly projecting portion of said support member;
    a cylindrical probe held by said support member in a freely extendible and retractable manner and having an open tip;
    a biasing mechanism biasing said cylindrical probe outwardly and holding the tip of said cylindrical probe at a position at which it covers the periphery of said temperature sensor; and a switch mechanism sensing that said cylindrical probe has been retracted against a biasing force of said biasing mechanism and generating a trigger signal that starts the measurement of body temperatures.

2. A radiant-energy clinical thermometer according to claim 1, further comprising a locking mechanism preventing said cylindrical probe from retracting from the position at which it covers the periphery of said temperature sensor.

3. A radiant-energy clinical thermometer according to claim 2, wherein said locking mechanism includes a locking lever operated from outside the case body.

4. A radiant-energy clinical thermometer according to claim 1, wherein the tip of said cylindrical probe is configured to receive a cover, said cover suitable for insertion into the ear of a human being.

5. A radiant-energy clinical thermometer according to claim 4, further comprising a mechanism pushing out said cover along said cylindrical probe in order to detach the cover.

6. A radiant-energy clinical thermometer according to claim 5, wherein said pushing mechanism includes a slider manually operated from outside the case body.

7. A radiant-energy clinical thermometer for measuring body temperature comprising:

a support member having a portion projecting outwardly from a case body;

a radiant-temperature sensor attached to a tip of the outwardly projecting portion of said support member;

a cylindrical probe held by said support member in a freely extendible and retractable manner and having an open tip;

a biasing means for biasing said cylindrical probe outwardly and holding the tip of said cylindrical probe at a position at which it covers the periphery of said temperature sensor; and switch means for sensing that said cylindrical probe has been retracted against a biasing force of said biasing means and generating a trigger signal that starts the measurement of body temperature.

8. A radiant-energy clinical thermometer according to claim 7, further comprising locking means for preventing said cylindrical probe from retracting from the position at which it covers the periphery of said temperature sensor.

9. A radiant-energy clinical thermometer according to claim 8, wherein said locking means includes a locking lever operated from outside the case body.

10. A radiant-energy clinical thermometer according to claim 7, wherein the tip of said cylindrical probe is configured to receive a cover, said cover suitable for insertion into the ear of a human being.

11. A radiant-energy clinical thermometer according to claim 10, further comprising a means for pushing out said cover along said cylindrical probe in order to detach the cover.

12. A radiant-energy clinical thermometer according to claim 11, wherein said pushing means includes a slider manually operated from outside the case body.

* * * * *